United States Patent
Handa et al.

[11] Patent Number: 5,896,776
[45] Date of Patent: Apr. 27, 1999

[54] PINION GEAR WITH SPLINED COUPLING DIRECTLY TO A DRIVE SHAFT

[75] Inventors: Akio Handa; Bunzo Seki, both of Saitama, Japan

[73] Assignee: Honda Giken Kogyo Kabushiki Kaisha, Tokyo, Japan

[21] Appl. No.: 08/682,089

[22] Filed: Jul. 17, 1996

Related U.S. Application Data

[60] Provisional application No. 60/009,308, Dec. 28, 1995.

[51] Int. Cl.⁶ ..................................................... F16H 1/14
[52] U.S. Cl. ................................. 74/424; 74/385; 74/417
[58] Field of Search .............................. 74/423, 424, 440, 74/409, 459.5, 385, 396, 417

[56] References Cited

U.S. PATENT DOCUMENTS

| | | |
|---|---|---|
| 1,532,557 | 4/1925 | Sturt .......................................... 74/424 |
| 2,019,464 | 10/1935 | Riblet ......................................... 74/424 |
| 2,037,206 | 4/1936 | Boden ........................................ 74/424 |
| 4,527,443 | 7/1985 | Ohoka ........................................ 74/417 |
| 4,534,440 | 8/1985 | Sekizaki et al. . | 
| 4,651,587 | 3/1987 | Anderson et al. .......................... 74/424 |
| 4,667,760 | 5/1987 | Takimoto . |
| 4,730,689 | 3/1988 | Takashashi et al. . |
| 4,811,810 | 3/1989 | Watanabe . |
| 4,856,373 | 8/1989 | Washizawa . |

*Primary Examiner*—Rodney H. Bonck
*Assistant Examiner*—David M. Fenstermacher
*Attorney, Agent, or Firm*—Birch, Stewart, Kolasch & Birch, LLP

[57] ABSTRACT

An pinion gear includes a shaft having an input end, an output end and an intermediate portion being disposed therebetween. The input end includes a spline portion for directly securing the pinion gear to a drive shaft. The output end includes gear teeth for meshing engagement with a ring gear of a drive gear assembly. The intermediate portion includes a surface for mounting a bearing for supporting the pinion gear during use.

14 Claims, 5 Drawing Sheets

5,896,776

PINION GEAR WITH SPLINED COUPLING DIRECTLY TO A DRIVE SHAFT

This is provisional Application Ser. No 60/009,308 filed Dec. 28, 1995.

BACKGROUND OF THE INVENTION

1. Field of the Invention

A pinion gear for transmitting rotary motion to a drive assembly for an all-terrain vehicle (ATV) is provided wherein the pinion gear is spline coupled directly to a drive shaft.

2. Description of Background Art

Hithertofore, pinion gears have been provided for all-terrain vehicles wherein a collar is positioned on the input side of the pinion gear for providing a spline to couple the pinion gear to the drive shaft. This arrangement requires a threaded section to be formed in an end portion of the input side of the pinion gear so as to permit a nut to retain the collar relative thereto. A conventional pinion gear for an all-terrain vehicle is expensive to construct in view of the multiple parts that are required and the machining to secure the parts relative to each other.

It is difficult to service a pinion gear of a conventional all-terrain vehicle due to the complicated arrangement which requires disconnecting the threaded nut and the collar during repairs.

SUMMARY AND OBJECTS OF THE INVENTION

The present invention is directed to a pinion gear for a vehicle wherein the input portion of the pinion gear is spline coupled directly to a drive shaft for the vehicle.

It is an object of the present invention to provide a one piece pinion gear for transmitting rotary motion from the drive shaft to the axle assembly. The present invention provides a pinion gear which is lower in weight, costs less to manufacture and reduces the number of parts needed for construction.

These and other objects of the present invention are achieved by providing a pinion gear having an input portion including a spline for mounting the input portion of the pinion gear directly to a drive shaft. An output portion of the pinion gear includes gear teeth in meshing engagement with a ring gear for transmitting rotary motion thereto.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
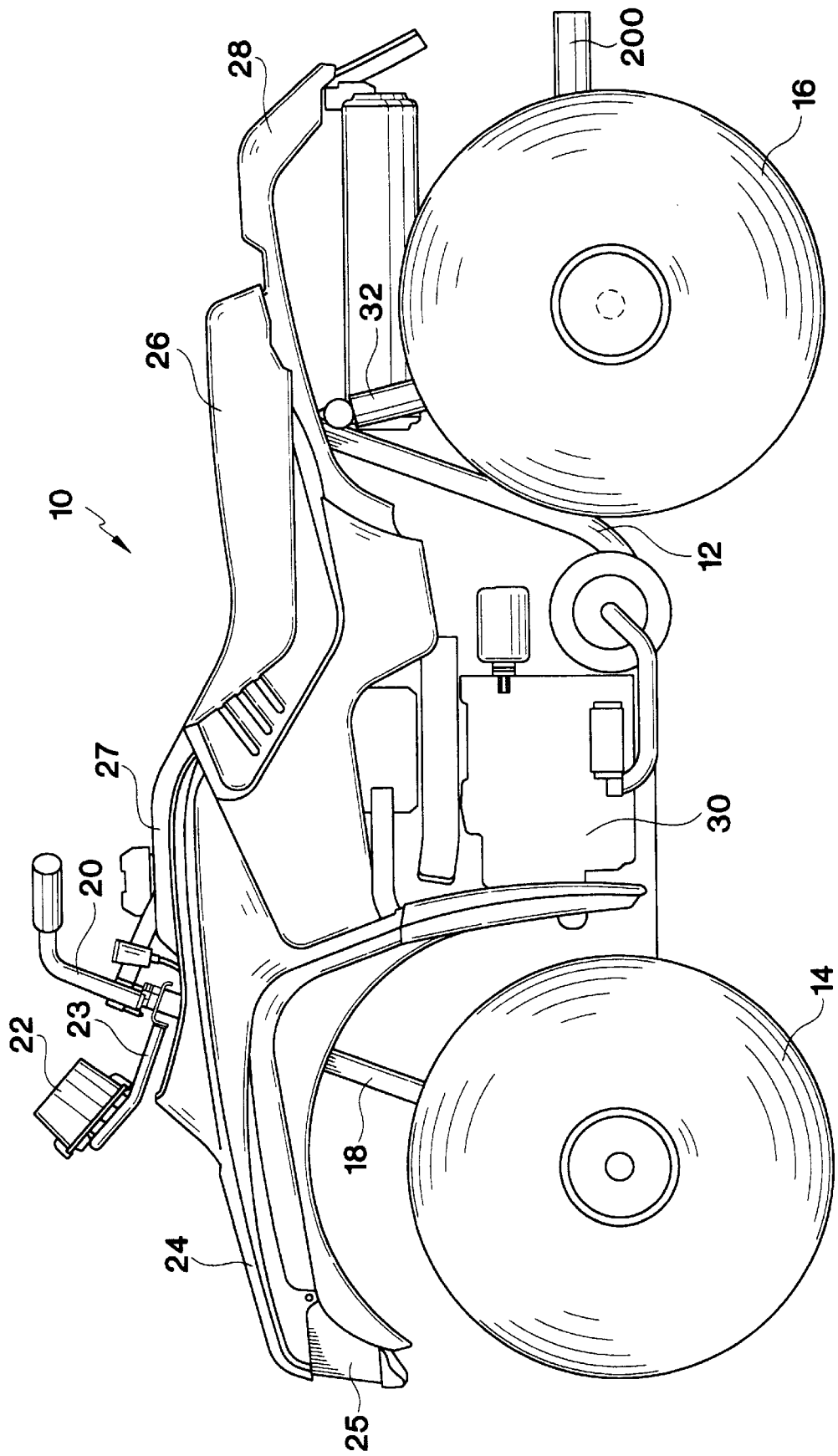
FIG. 1 is a side elevational view illustrating an all-terrain vehicle which incorporates the pinion gear of the present invention.

FIG. 1 is a side elevational view illustrating an all-terrain vehicle 10 which includes a frame 12. The frame 12 is provided for mounting the front wheel 14 and the rear wheel 16 relative thereto. FIG. 1 is directed to a four wheel all-terrain vehicle. However, the present invention may be used together with a three wheel all-terrain vehicle. A front support assembly 18 is mounted to the frame 12 and is operatively connected to handlebars 20 for imparting steering motion to the front wheels 14 during use. A speedometer/odometer 22 is mounted on a bracket 23 for securing the speedometer/odometer 22 relative to the front support assembly 18. A front fender 24 is provided adjacent to the front of the frame 12. A headlight 25 is mounted in the fender 24 for illumination during use of the all-terrain vehicle 10. A rear fender 28 is mounted on the frame 12 adjacent to the rear wheel 16.

A motor 30 is mounted adjacent to the central portion of the frame 12 for providing operative power to impel the all-terrain vehicle 10 across a ground surface. A shock absorber 32 is mounted to the frame 12 and a rear axle for absorbing some of the shock which occurs during use of the all-terrain vehicle. A gas tank 27 is mounted adjacent to the handlebars 20 for supplying fuel to the motor 30 during use.

Figure 2:
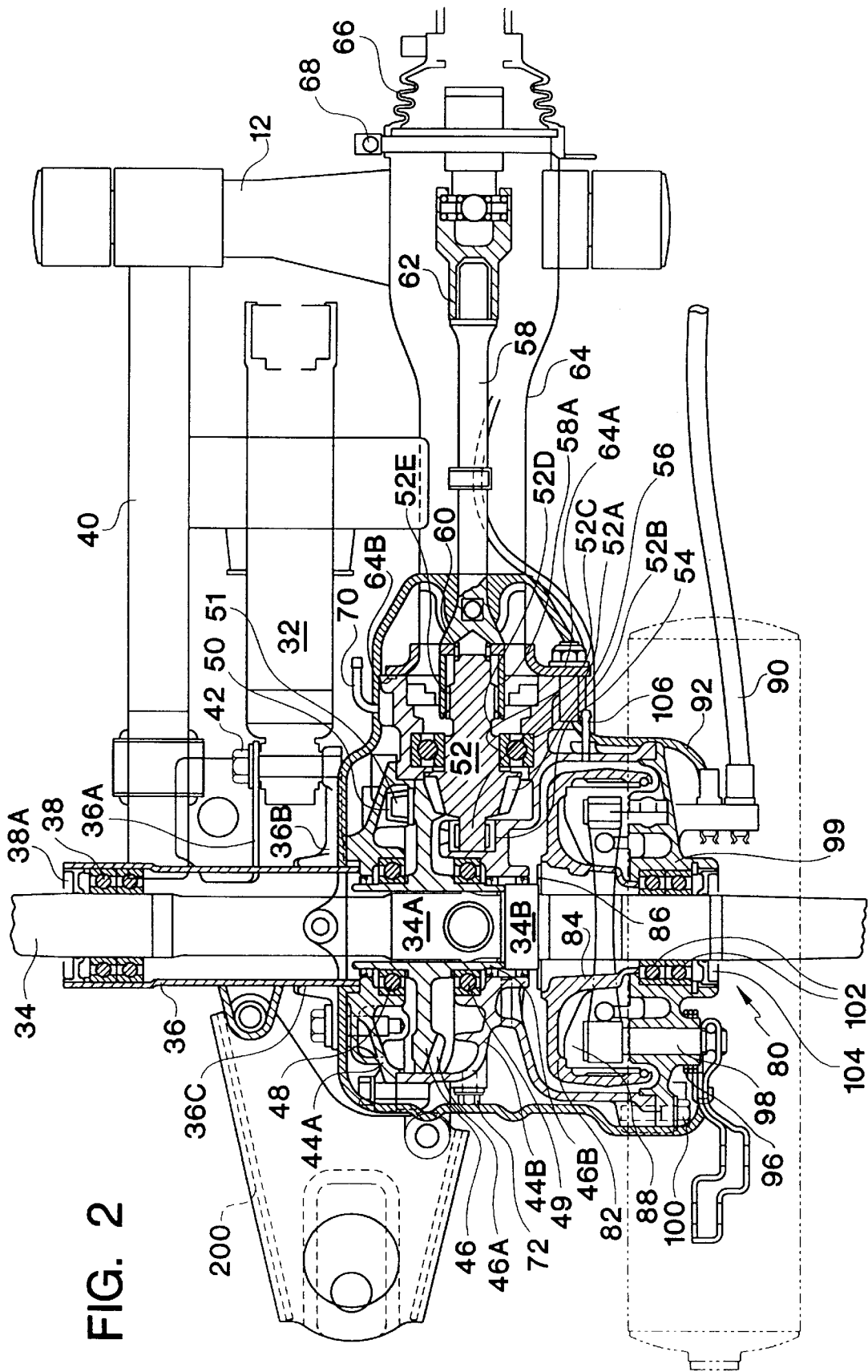
FIG. 2 is a partial cross-sectional view illustrating the pinion gear in combination with an axle assembly which includes a flange for mounting a drive gear assembly and a brake drum assembly relative to each other.

As illustrated in FIG. 2, an axle 34 is operatively mounted within a tubular housing 36. Bearings 38 are mounted between the tubular housing 36 and the axle 34 for permitting rotation of the axle 34 relative to the tubular housing 36. A seal 38A is provided adjacent to the bearings 38 for preventing dust, dirt, water or other debris from entering into the bearings 38 and being disposed adjacent to the axle 34.

A swing arm 40 is operatively mounted relative to the tubular housing 36 and to a portion of the frame 12 for retaining the tubular housing 36 and the axle 34 in a predetermined disposition relative to the frame 12. The tubular housing 36 includes extensions 36A, 36B and 36C which extend outwardly therefrom. Tubular housing extensions 36A and 36B are designed for permitting a shock absorber 32 to be secured thereto by means of a bolt 42. The extension 36C is designed for securing the tubular housing 36 relative to a gear case 44A, 44B.

A ring gear 46 includes gear teeth 46A and an orthogonally projecting extension 46B. The orthogonally projecting extension 46B is splined onto the section 34A of the axle 34. The section 34A is of a predetermined diameter and extends a predetermined distance along at least a portion of the orthogonally projecting extension 46B of the ring gear 46. A flange 34B is provided along a portion of the axle 34. The flange 34B is of a predetermined diameter which is larger than the diameter of the section 34A. The orthogonally projecting extension 46B of the ring gear 46 abuts against the flange 34B and is held in accurate alignment relative to the axle 34. Bearings 48, 49 are mounted adjacent to the outwardly extending portions of the orthogonally projecting extension 46B of the ring gear 46 to permit the gear case 44A and 44B to allow the ring gear 46 and the axle 34 to be rotated relative to the gear case 44A, 44B.

The gear case 44A includes an aperture 50 for mounting a shim pin 51 for providing a backing to the ring gear 46. A pinion gear 52 is mounted adjacent to and in meshing engagement with the ring gear 46. The pinion gear 52 includes a projection 52A which extends within a ring stop 54. The ring stop 54 is formed in the gear case 44B. The pinion gear 52 includes the gear teeth 52B which mesh with the gear teeth 46A on the ring gear 46. A reduced diameter portion 52C is provided adjacent to the central portion of the pinion gear 52. A bearing 56 is mounted on the reduced diameter portion 52C to permit rotation of the pinion gear 52 relative to the gear case 46B. The pinion gear 52 includes a further reduced section 52D and a spline section 52E. The spline section 52E is designed to engage the projection 58A of the drive shaft 58 to provide rotary motion to the pinion gear 52. A spring 60 is provided between the drive shaft 58 and the pinion gear 52 so as to provide a predetermined force on the pinion gear 52 towards the ring stop 54 and the gear case 46B. In this manner, the teeth 52B of the pinion gear 52 are held in engagement with the teeth 46A of the ring gear 46.

The drive shaft 58 is coupled to a differential gear 62 which is operatively connected to the motor 30 of the all-terrain vehicle 10.

A tubular housing 64 is mounted onto the gear case 44B by means of a bolt 64A and an indexing pin 64B. A rubber fitting 66 is secured to the housing 64 by means of a clamp 68. The housing 64, the rubber fitting 66 and the gear case 44A, 44B maintain a clean environment for the drive shaft 58, the pinion gear 52 and the ring gear 46 so as to permit rotary motion to be transmitted from the drive shaft 58 to the pinion gear 52 and the ring gear 46 to thereafter impart rotary motion to the axle 34.

A gear case breather 70 is provided for communicating with the interior of the gear case housing 44A, 44B. In addition, an oil check bolt 72 is provided on the gear case housing 44B for checking the oil disposed within the gear case housing 44B.

A brake assembly 80 is provided along the axle 34 adjacent to the gear case 44A, 44B. The brake assembly 80 includes a brake housing 82 which includes an outwardly projecting portion 84 which is splined onto the axle 34 for rotation therewith. A dish spring 86 is provided adjacent to the flange 34B and the brake housing 82. The brake housing 82 including the outwardly projecting portion 84 splined onto the axle 34 is of a predetermined diameter so as to engage the flange 34B with the dish spring 86 being disposed therebetween. A brake drum 88 is mounted within the brake housing 82 for selectively applying a force to the brake housing 82. A foot brake cable 90 is provided for transmitting a force from the foot pedal of the all-terrain vehicle 10 to the brake drum 88. A hand brake cable 92 is provided to extend upwardly towards the handlebars 20 for transmitting a force from a hand brake and through the hand brake cable 92 to actuate the brake drum 88 relative to the housing 82.

A spring 96 is provided adjacent to the stem 98 for deactuating the brake drum 88 from the brake housing 82 after a force, applied by either the foot brake cable 90 or the hand brake cable 92, is released. The spring 96 will disengage the brake drum 88 from the housing 82 to permit the axle 34 to continue to rotate. When the foot brake cable 90 or the hand brake cable 92 applies a force, the brake drum 88 will actually engage together with the brake housing 82 to stop rotary motion from being transmitted to the axle 34. A brake drum housing 99 is mounted on the gear case 44B by means of a bolt 100. Bearings 102 are provided adjacent to the brake housing 99 for permitting rotation of the axle 34 relative to the brake housing 99. A seal 104 is mounted around the axle 34 adjacent to the bearings 102 to prevent dust, dirt, water or other debris from entering into the gear case 44B.

A breather 106 for the brake assembly is provided. The breather 106 for the brake assembly is fully sealed to prevent dust, dirt, water or other debris from entering into the brake housing.

As illustrated in FIGS. 1 and 2, a trailer hitch 200 is secured to the tubular housing 36 and gear case 44A to permit a trailer to be connected to the all-terrain vehicle 10.

Figure 3:
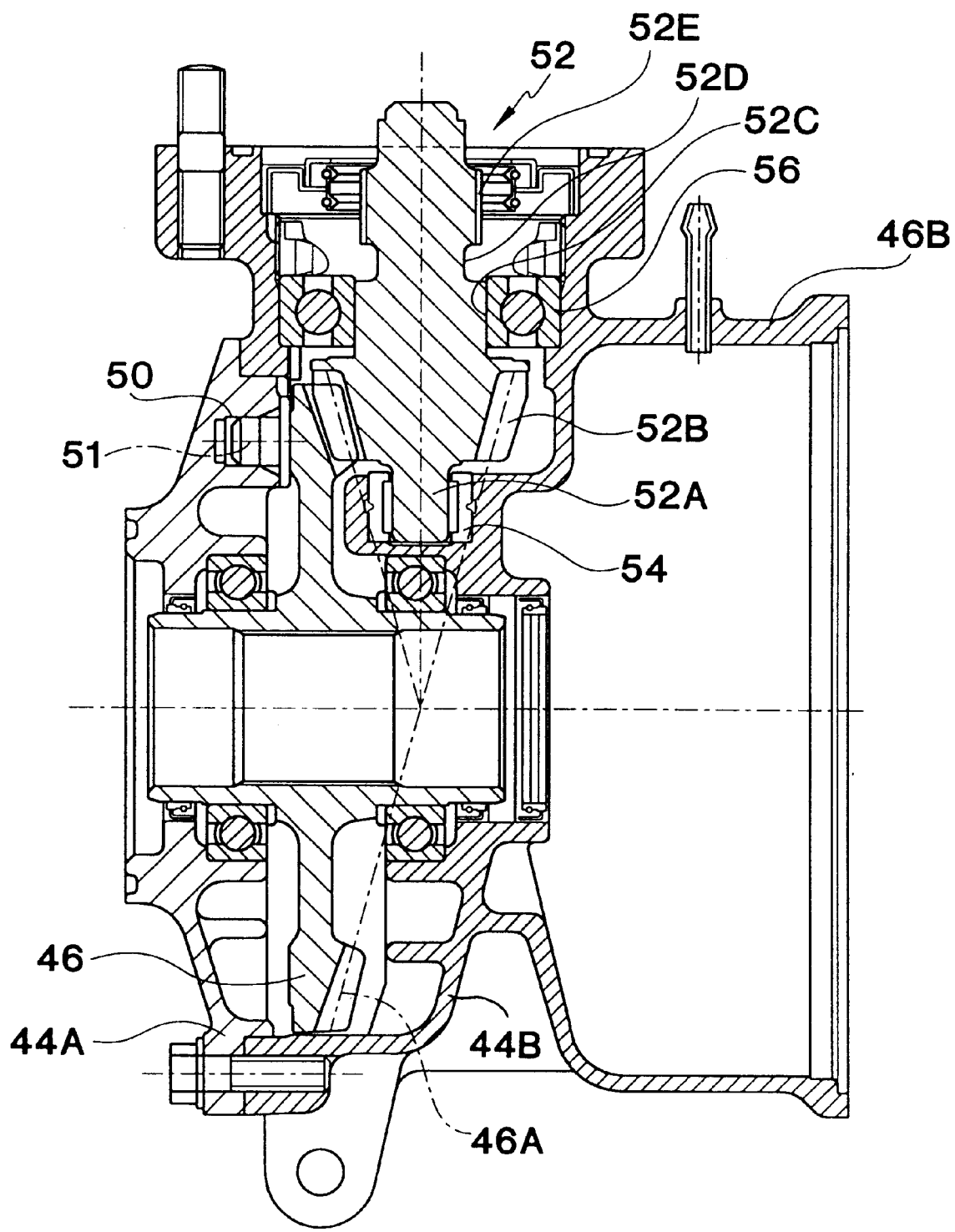
FIG. 3 is a partial cross-sectional view illustrating the engagement of the pinion gear with a ring gear of the drive gear assembly.
Figure 4:
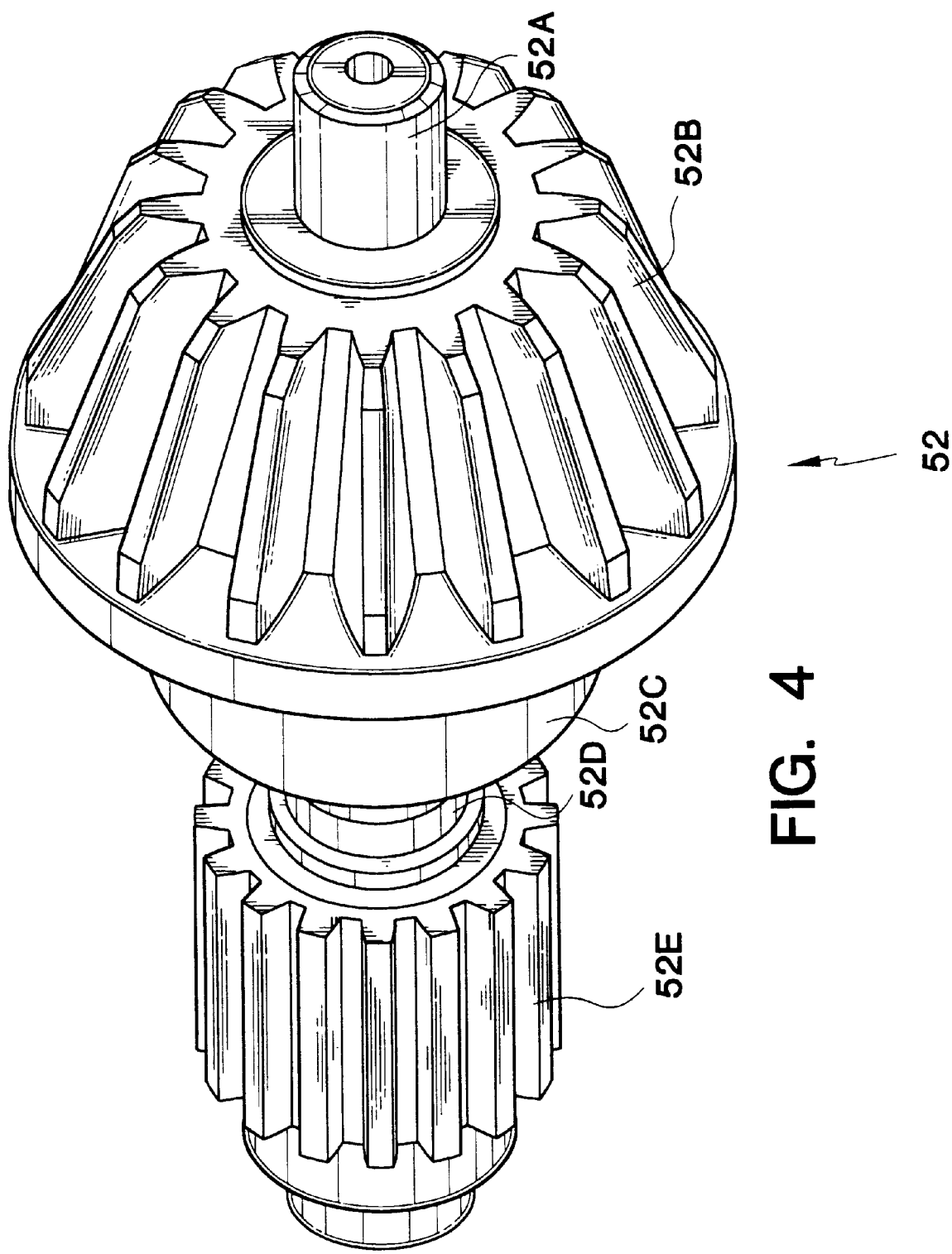
FIG. 4 is a perspective view of the pinion gear of the present invention.

FIG. 3 illustrates a partial cross-sectional view wherein the gear case 44A includes the aperture 50 for mounting the shim pin 51 for providing a backing to the ring gear 46. As illustrated in FIGS. 3 and 4, the pinion gear 52 is mounted adjacent to and in meshing engagement with the ring gear 46. The pinion gear 52 includes the projection 52A which extends within the ring stop 54. The ring stop 54 is formed in the gear case 44B. The pinion gear 52 includes the gear teeth 52B which mesh with the gear teeth 46A on the ring gear 46. The reduced diameter portion 52C is provided adjacent to the central portion of the pinion gear 52. The bearing 56 is mounted on the reduced diameter portion 52C to permit rotation of the pinion gear 52 relative to the gear case 46B. The pinion gear 52 includes a further reduced section 52D and a spline section 52E. The spline section 52E is designed to engage the projection 58A of the drive shaft 58 to provide rotary motion to the pinion gear 52.

The pinion gear 52 of the present invention does not require a collar mounted on the reduced section 52E for permitting a spline connection for the drive shaft. Thus, no threaded section of the pinion gear 52 or a nut to retain the collar to the pinion gear 52 is required.

The pinion gear 52 of the present invention may be cold forged and roll formed with a spherical spline formed directly on the reduced section 52E. The shaft may be machined to provide desired exterior surfaces.

Figure 5:
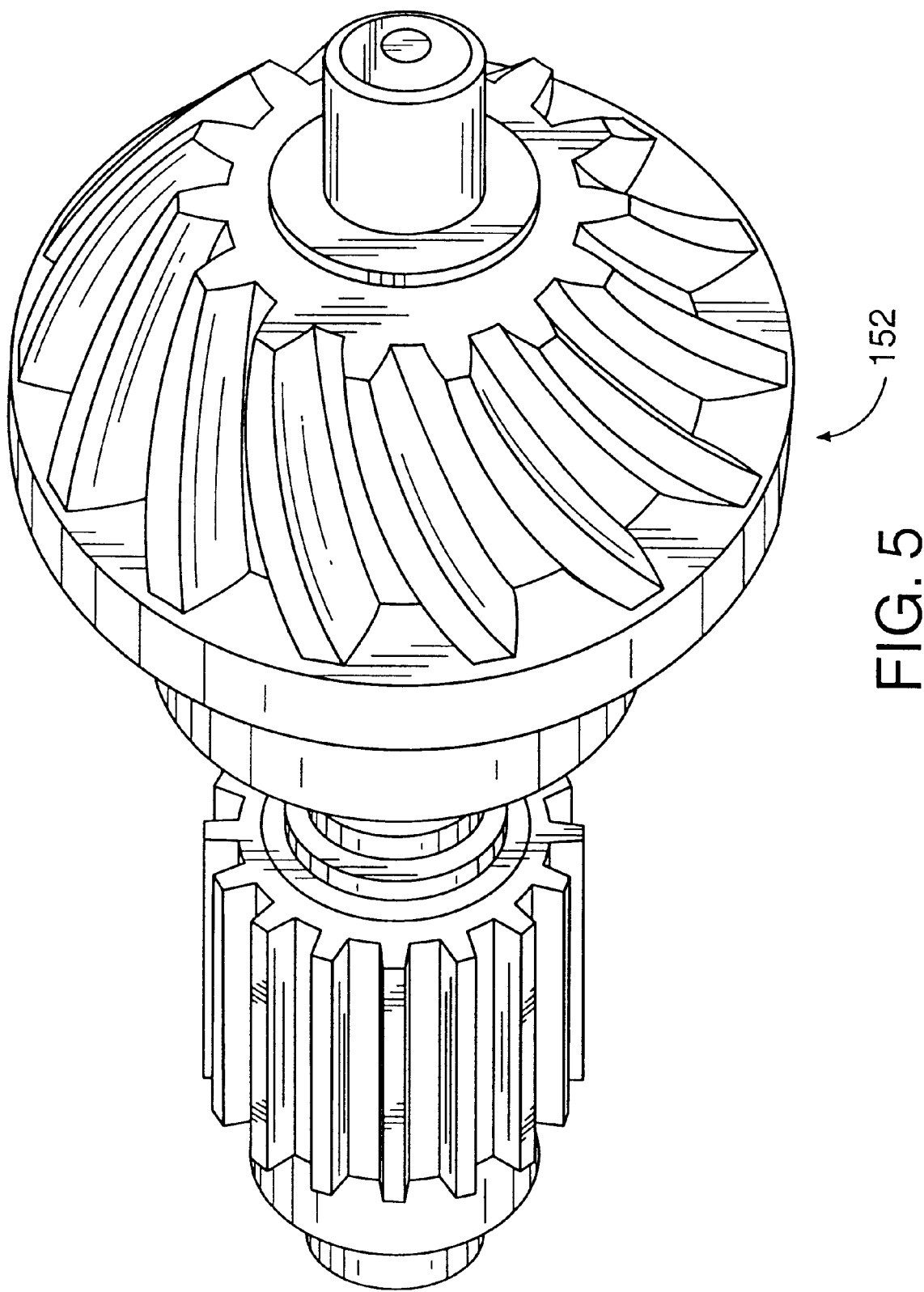
FIG. 5 is a perspective view of the pinion gear with helical gear teeth according to the present invention.

A slight press fit of the bearing holds the straight type pinion gear 52 in position relative to the ring gear 46. Not too much longitudinal movement occurs due to the design of the straight pinion gear teeth 52B. The spring force exerted by spring 60 on the pinion gear 52 is sufficient to retain the drive shaft 58 relative to the pinion gear 52 and the ring gear 46. However, it is to be noted that the present invention may also work together with helical gear threads, as illustrated in FIG. 5, disposed on the pinion gear 52.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pinion gear for a vehicle comprising:
   a shaft having an input end, an intermediate portion and an output end;
   said input end including a spline portion for directly mounting said pinion gear to a drive shaft, said drive shaft being mounted directly on said spline portion, said pinion gear not including a threaded portion;

said output end including gear teeth for meshing engagement with a ring gear of a drive gear assembly; and said intermediate portion including a surface for mounting a bearing for supporting said pinion gear during use.

2. The pinion gear according to claim 1, wherein said gear teeth are straight teeth.

3. The pinion gear according to claim 1, wherein said gear teeth are helical teeth.

4. The pinion gear according to claim 1, wherein said spline portion is formed in a reduced section of the pinion gear for permitting a direct connection between the pinion gear and said drive shaft.

5. The pinion gear according to claim 1, wherein said output end includes a projection for engaging a ring stop for the pinion gear.

6. The pinion gear according to claim 1, wherein said pinion gear is directly attached to said drive shaft without a collar or a nut.

7. A pinion gear and ring gear for an axle assembly for a vehicle comprising:

a shaft having an input end, an intermediate portion and an output end;

said input end including a spline portion for directly mounting said pinion gear to a drive shaft, said drive shaft being mounted directly on said spline portion, said pinion gear not including a threaded portion;

said output end including gear teeth for meshing engagement with a ring gear of a drive gear assembly;

said intermediate portion including a surface for mounting a bearing for supporting said pinion gear during use for imparting rotation from said pinion gear to said ring gear.

8. The pinion gear and ring gear for an axle assembly according to claim 7, wherein said gear teeth are helical teeth.

9. The pinion gear and ring gear for an axle assembly according to claim 7, wherein said spline portion is formed in a reduced section of the pinion gear for permitting a direct connection between the pinion gear and [a] said drive shaft.

10. The pinion gear and ring gear for an axle assembly according to claim 7, wherein said output end includes a projection for engaging a ring stop for the pinion gear.

11. The pinion gear and ring gear for an axle assembly according to claim 7, wherein said gear teeth are straight teeth.

12. The pinion and ring gear for an axle according to claim 7, wherein said pinion gear is directly attached to said drive shaft without a collar or a nut.

13. A pinion gear for a vehicle comprising:

a shaft having an input end, an intermediate portion and an output end;

said input end including a spline portion for directly mounting said pinion gear to a drive shaft, said drive shaft being mounted directly on said spline portion, said pinion gear being free from threaded portions;

said output end including gear teeth for meshing engagement with a ring gear of a drive gear assembly; and said intermediate portion including a surface for mounting a bearing for supporting said pinion gear during use.

14. The pinion gear according to claim 13, wherein said pinion gear is directly attached to said drive shaft without a collar or nut.

* * * * *